United States Patent [19]

Pray

[11] 4,065,045

[45] Dec. 27, 1977

[54] FASTENER DRIVER TOOL

[75] Inventor: Winston C. Pray, Lombard, Ill.

[73] Assignee: Flexible Steel Lacing Company, Downers Grove, Ill.

[21] Appl. No.: 746,636

[22] Filed: Dec. 1, 1976

[51] Int. Cl.² .............................................. B25C 1/02
[52] U.S. Cl. .................................... 227/147; 227/149
[58] Field of Search ............................... 227/147, 149

[56] References Cited

U.S. PATENT DOCUMENTS

| 1,671,080 | 5/1928 | Merrick | 227/147 |
| 2,786,202 | 3/1957 | Gaulke | 227/147 |
| 2,839,754 | 6/1958 | Pfaff | 227/147 |
| 2,973,527 | 3/1961 | Maynard et al. | 227/147 |
| 3,134,981 | 6/1964 | Demetrakopoulos et al. | 227/149 |
| 3,854,648 | 12/1974 | Inzoli et al. | 227/149 |

Primary Examiner—Granville Y. Custer, Jr.

Attorney, Agent, or Firm—Fitch, Even, Tabin & Luedeka

[57] ABSTRACT

A hand-held driver tool is disclosed for holding and aligning the axis of elongated fastener with another axis such as the axis of the tool or such as an axis through a pair of apertures in upper and lower belt fastener plates and an aperture in an underlying anvil support means. The preferred driver tool comprises a housing means with an elongated bore within one end of which there is received an expandable chuck means and within the other end of which there is slidably received a driver means. An elongated fastener such as a rivet-nail is inserted within the bore and into the chuck for being driven into a piece such as a belt upon an impact force being applied to the driver. A cone-shaped end on the lower end of the tool is inserted into a cavity in the belt fastener and a cooperating flange abuts the belt fastener to align coaxially the apertures and the axis of the elongated rivet-nail assembly.

6 Claims, 10 Drawing Figures

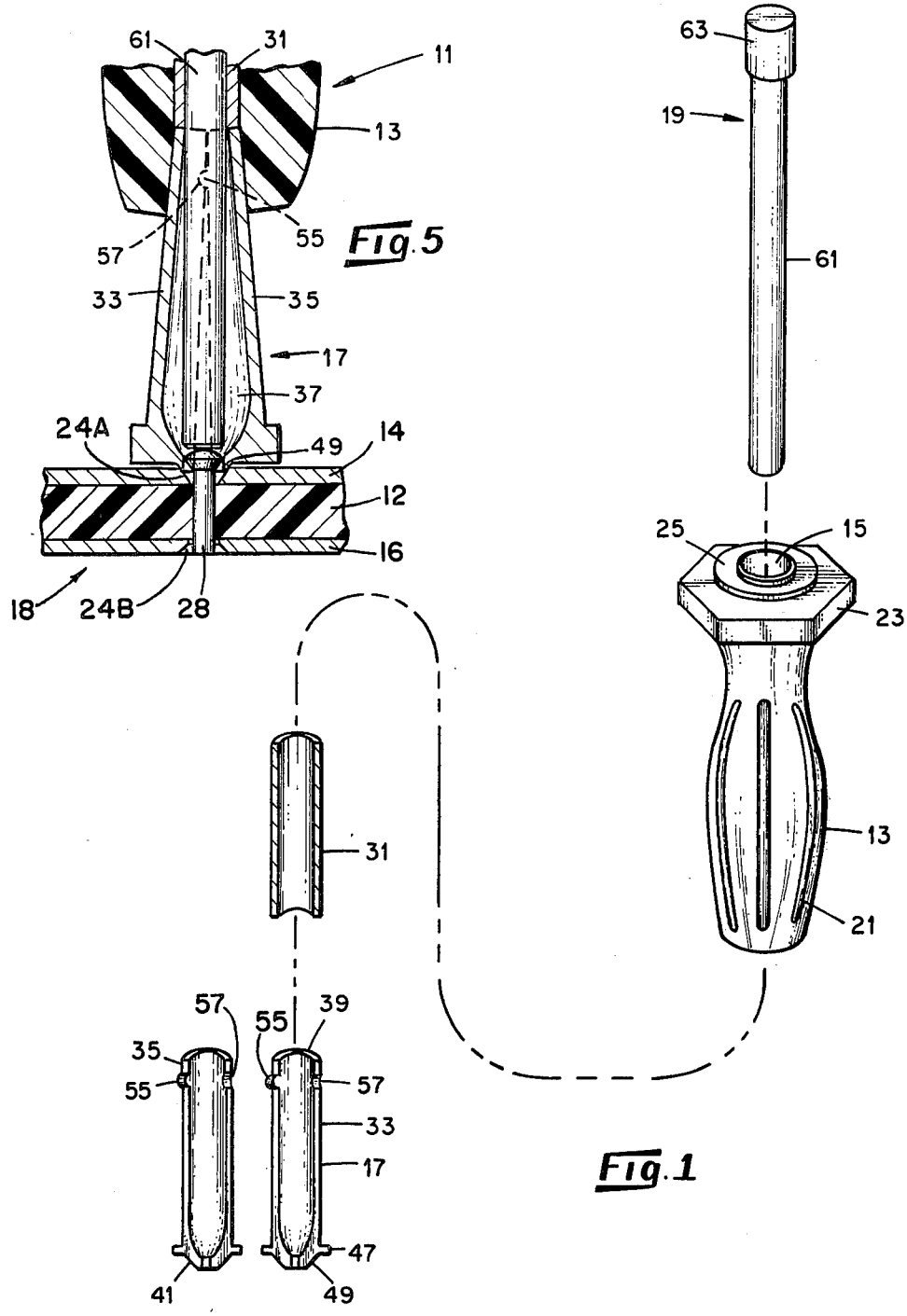

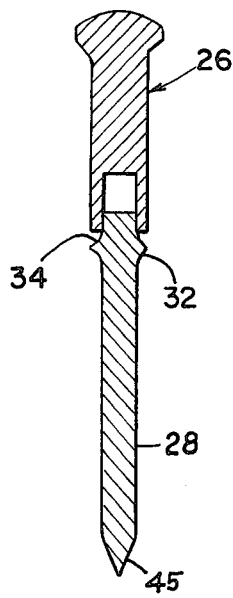
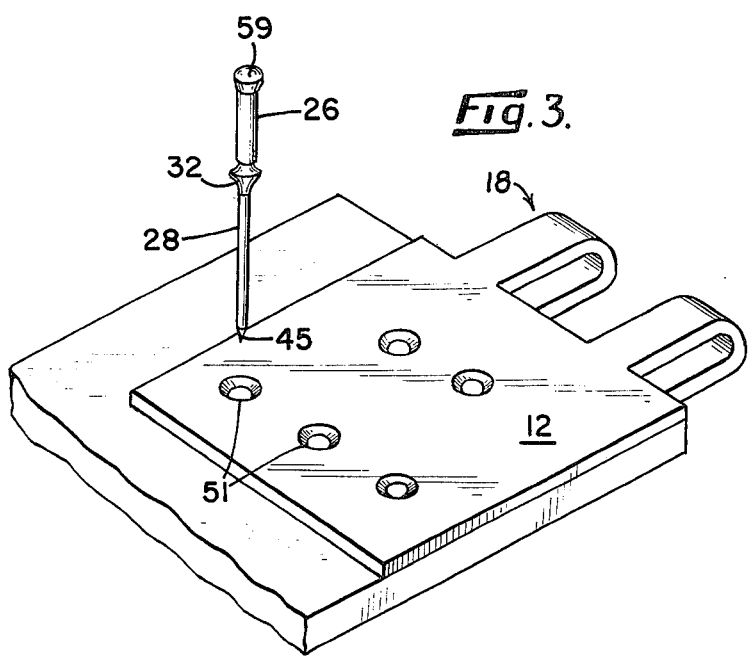
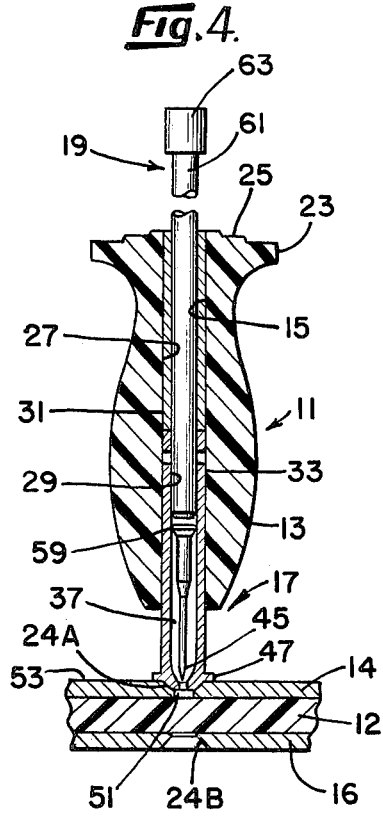
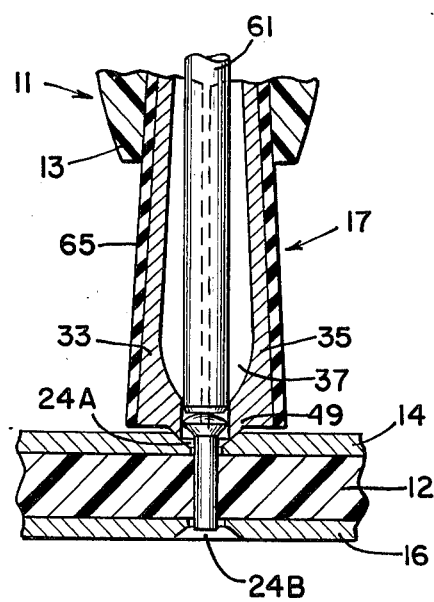

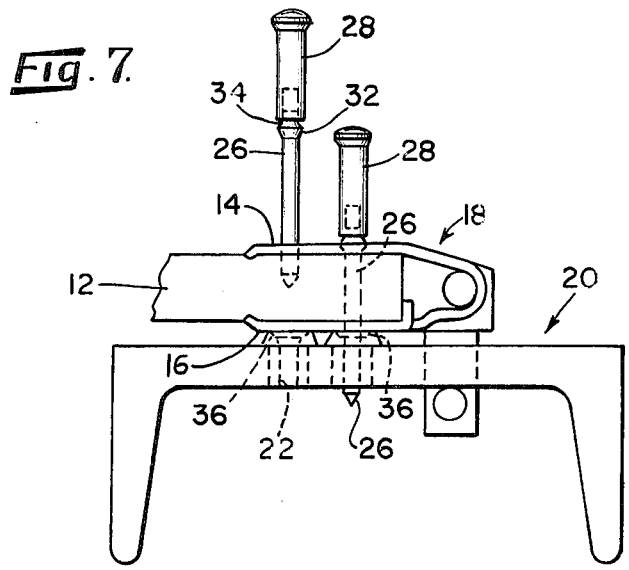
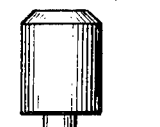
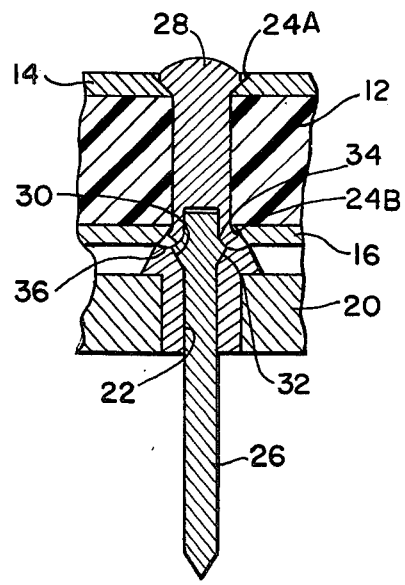
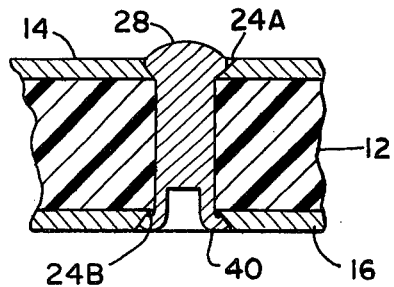
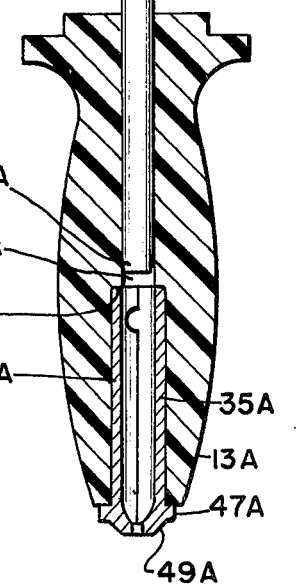

FASTENER DRIVER TOOL

This invention relates to a tool useful as an aid in inserting elongated fastening devices, more particularly rivet-nail assemblies into and through belts by a substantial insertion force from a hammer. One instance of the usefulness of the present tool is the driving of rivet-nail assemblies through "endless" conveyor belts and their attendant hinge belt fasteners, such as disclosed in U.S. Pat. No. 3,913,180, to seat the nail in an underlying anvil support means which cooperates with the rivet nail to spread and flare the bottom end of the rivet. However, the invention is not limited to such application as the tool may be used with concrete nails, rivets only, or other rivet-nail assembles, e.g., the rivet-nail assemblies in which the nail releases from the rivet after the nail passes through the belt, as shown in U.S. Pat. No. 3,742,557.

Prior to the present invention, nail-tipped rivet fastening devices have been held in one hand while an insertion force, usually a hammer blow, was applied to the head of the fastening device. This method has certain deficiencies including the fact that if the nail or the force, particularly if the manual hammer blows, were not applied exactly along the axis of the rivet-nail assembly the nail may miss the aperture either in underlying plate of the belt fastener or in the receiving aperture in the underlying anvil support means. Also, to form the lower head of the rivet properly it is desired that the rivet be substantially perpendicular to the belt, that is straight vertically and not cocked at an angle when the hammer blows are applied to the upper head of the rivet to flare and deform the lower end of the rivet into a rivet head fully and neatly seated in a receiving concavity therefor in the lower plate of the belt fastener. If the rivet-nail assembly were hit off-center, the rivet could separate from the nail and strike the body of the person doing the application. Also, the hands and fingers holding the rivet-nail assembly are unprotected from being hit by the hammer.

Certain peculiar problems are faced by a workman who is required to insert elongated fastening devices such as the rivet-nail assemblies disclosed in U.S. Pat. No. 3,913,180, to connect the ends of continuous belts which may be as wide as four feet, and which are located in underground mines. These belts are subjected to extremely harsh conditions of use and therefore have a tendency to break. The breaks often occur at locations where there is very little space in which the repair can be made, such as within tunnels which are only slightly wider than the belt passing therethrough. Because typically five rivet-nail assemblies must be inserted through each belt fastener, the tool should be fast, strong, safe and easy to use. It is desirable that the operator may load the tool and then move it and the rivet-nail member as an essentially unitary assembly in any direction to reach the desired point of insertion without loss of the rivet-nail. Moreover, the tool must be safe as the hammer blows imparted thereto may be substantial and cause a separated rivet to hit one's body, or smash one's fingers and hands if they are unprotected.

The rivet-nail assemblies (and most elongated fastening devices) have a force-receiving end (the head) which is broader than the inserting or leading end (sharpened end). Therefore, a tool which includes a bore designed to allow passage of the head of the rivet-nail generally allows the leading end of the fastening device to wobble freely within the bore. This free movement makes proper positioning difficult, causes a lateral force to be applied to the device if it is struck with a driving force while out of alignment, and varies the angle of insertion. In some situations the angle of insertion is critical, such as is true in the case of a rivet-nail assembly that must pass through two small coaxial holes in opposite plates of a belt fastener separated by the thickness of a woven or molded belt and then into an aperture in an underlying anvil means.

Some prior art tools, such as that disclosed in U.S. Pat. No. 3,391,842, are capable of applying a longitudinal force to an elongated fastening device, yet these tools require a separate guide means to insure that the fastening device is positioned at the proper angle before striking. As noted, positioning and angle problems arise particularly if the fastening device is one which is long in length and has a sharp point at its leading or entering end. In an effort to solve the problem of fastening device alignment, the prior art tools have employed means such as predrilled bores within the object to be fastened for receiving the tip of a fastening device, or an annular member, such as a washer, positioned within the bore of the tool and around the sharpened end of the fastening device to center the leading end of the fastening device within the bore. These tools, therefore, were limited to specific uses and/or required inordinate time for loading a fastening device into the tool. Additionally, the prior art tools did not firmly hold the fastening device prior to positioning, so that positioning the fastening device and the tool required two hands or two operations.

It is a general object of the present invention to provide an improved tool for applying elongated fasteners to an object.

Another object of the invention is to provide a tool for use in the insertion of an elongated fastening device, such as a rivet-nail combination used in joining belt fasteners to a belt end, wherein the tool holds the fastening device firmly before placement, orients the fastening device with respect to the objects to be joined, and transmits a longitudinally aligned driving force to the fastening device.

It is a further object to provide a tool of the type described which is safe for the operator.

Other objects and advantages of the invention will be apparent from the following description, including the drawings in which:

FIG. 1 is an exploded view of a tool showing various features of the invention;

FIG. 2 is an enlarged view of one fastening device for which the disclosed tool is useful;

FIG. 3 is a fragmentary view of a belt end and hinge means and depicting the preferred orientation of a rivet-nail assembly relative thereto;

FIG. 4 is a fragmentary view of the disclosed tool holding a rivet-nail assembly immediately prior to insertion through a pair of holes and an interposed belt;

FIG. 5 is a fragmentary view of the disclosed tool and a rivet immediately prior to final expulsion of the rivet from the tool;

FIG. 6 is a fragmentary view of an alternative embodiment of the apparatus depicted in FIG. 5;

FIG. 7 is an end view of a rivet-nail assembly penetrating the belt and into an underlying anvil support means;

FIG. 8 is an enlarged cross-sectional view of a rivet being deformed by the anvil nail and anvil support means to clinch the belt fastener to the belt;

FIG. 9 is a cross-sectional view illustrating the rivet clinching the belt fastener to the belt; and FIG. 10 is a cross-sectional view illustrating another embodiment of the invention.

The disclosed tool 11 for positioning and inserting fastening devices such as a rivet-nail assembly generally comprises a housing means 13, preferably expandable and adapted to be hand-held, defining an elongated bore 15, laterally expandable chuck means 17 coaxially disposed at least partly within the bore, a driver means in the form of an elongated punch 19 slidably received within the bore and the chuck means, and means to assist orientation of the tool to drive the rivet-nail assembly straight.

In use, the driver means is first withdrawn from the housing means. A rivet-nail assembly is placed into the open end of the bore and falls into the chuck means with at least the leading end of the nail being guided by the chuck means into axial alignment with the bore. The driver is then partially reinserted into the bore to block withdrawal of the rivet-nail assembly and to position the punch driver for delivery of an insertion force to the rivet-nail assembly. The loaded tool is guided by an orienting means on the lower end of the tool to a straight upright position and a force is applied to the driver means. The latter pushes the rivet-nail assembly through the chuck which expands to allow the rivet-nail assembly to penetrate along a straight line and the workpieces being fastened. The housing means protects the hands of the person holding the tool and prevents the rivet from separating and flying at the person.

The tool shown in the drawings embodies various of the features of the invention. As has been noted, the illustrated embodiment is adapted to the insertion of rivet-nail assemblies of the kind disclosed in U.S. Pat. No. 3,913,180 which includes as best seen in FIGS. 7 and 8, belt 12 may have an end thereof inserted between an upper plate 14 and a lower plate 16 of a belt fastener 18 which is held on an anvil support means 20 located beneath the belt fastener and the belt. Within the anvil support means 20 are a series of nail receiving apertures 22 each aligned with apertures 24A and 24B in the respective belt fastener plates 14 and 16. As fully described in U.S. Pat. No. 3,913,180, each rivet-nail assembly comprises a lower anvil-nail 28 and an upper releasably attached rivet 26. As the anvil-nail assembly is driven into the belt, it is important that the longitudinal axis thereof be vertical and hence in alignment with the underlying nail-receiving aperture 22 in the anvil support means. The latter has an upper defining wall 30 of frusto-conical shape to seat a complementary-shaped frusto-conical wall 32 on the upper end of the anvil nail 26 to stop further downward movement of the nail, whereupon further blows on the upper rivet head cause the lower hollow end of the rivet to flare radially outwardly along curved anvil surfaces 34 on the nail and then onto curved anvil surfaces 36 on the anvil support means which cause the formation of the lower rivet head 40 as best seen in FIG. 9.

Referring more particularly to the drawings, the illustrated tool 11 includes an expandable bulbous housing means 13 defining an elongated bore 15 extending the length thereof. In a preferred embodiment, the housing means 13 is of a high impact plastic material that is capable of repeated expansion and contraction for purposes that will appear more fully hereinafter. The housing means serves as a protective handle which may be gripped in the hand of the operator. To this end, the depicted housing means 13 is of a bulbous form, and has longitudinal ribs 21 and a radial flange 23 at its receiving end 25 all to insure that the tool will not readily slip from the operator's grasp. Further, the radial flange 23 provides protection to the operator's hand against an errant hammer blow.

In the depicted embodiment, the bore 15 defined along the length of housing means 13 is divided into a loading section 27 and a discharge section 29 that is provided with a larger diameter of the loading section. These sections are axially aligned, with the discharge section being substantially a continuation of the loading section. As desired, the loading section 27 of the housing bore is provided with a metal sleeve bushing 31 to reduce wear and tear of the housing as the driver 19 is moved in and out of the bore.

Within the discharge section 29 of the bore 15 there is disposed the chuck means 17. In the depicted embodiment this chuck means 17 comprises two elongated rigid jaws 33 and 35 having respective substantially semicircular cross sections along the major portion of their length and which mate to cooperatively define a central bore 37 including a receiving end 39 and a discharging end 41. The bore 37 is of substantially the same internal diameter as the loading section of the bore 15 in the housing 13 and forms a continuation thereof so that a fastening device loaded into the housing bore 15 readily slides into the bore 37 defined by the chuck jaws. The chuck bore 37 tapers radially inwardly along a curve from a location within the bore toward the discharging end 41 of the chuck to define a central exit opening so that a leading end 45 of a fastening device is guided to a centered position with respect to the bore 37.

To orient or position the tool and the rivet-nail assembly to drive the nail and rivet along a straight vertical line perpendicular to the top plate of the belt fastener, the lower end of the tool is provided with a guiding or orienting means which nests in and about the concavity 51 in the top plate. In the depicted embodiment, the orienting means comprises a radially outwardly extending circumferential flange 47 and a truncated conical outline 49 at the distal end of the chuck means. The truncated conical portion is disposed between the flange 47 and the discharging end 41 of the chuck 17 with the base of the conical portion 49 adjoining the flange.

As seen in FIG. 4, during use of the tool, the truncated conical portion mates with a receiving concavity 51 of the upper aperture 24A and the flange abuts the upper surface 53 of the upper plate 14 of the belt fastener over a substantial area, thereby maintaining the tool and fastening device substantially perpendicular to the surface 53. The particular size and shape of the truncated conical portion in the depicted embodiment are determined by the size and shape of the receiving concavity 51 in the belt fastener. Notably, by reason of the conical geometry provided on the discharging end of the chuck means, there is provided lateral freedom of movement of the jaws as the chuck expands to allow the rivet-nail assembly to pass therethrough. Thus, initially, the present tool provides for precise positioning of the longitudinal axis of the rivet-nail assembly relative to the apertures 24A and 24B in the belt fastener and aperture 22 in the anvil support means while accommodating the expansion of the jaws as the assembly is driven through the chuck into the belt and belt fastener. Additionally, the conical geometry provides inherent guidance of the tool into a receivin-concavity thereby facilitating positioning of the tool even under adverse conditions of sight and reach.

As depicted in FIG. 1, the jaws 33 and 35 are preferably identical in shape so that only one piece part need be inventoried. In the illustrated embodiment, each jaw is formed with a semicircular lug 55 projecting outwardly at the upper end of one edge wall and with a semicircular cavity 57 of complementary size in the opposite edge wall. When two jaws are disposed with their edge walls face-to-face a lug 55 on each jaw is received in a cavity 55 on the other jaw. The nested lugs and cavities lock the jaws against longitudinal movement relative to one another. The lugs and cavities preferably are positioned near the receiving ends of the jaws in order that the jaws do not disengage significantly when their discharging ends are expanded upon discharge of the fastening device therethrough. Notably, the semicircular geometry of the lugs and receiving cavities provides for angular motion of the jaws relative to one another as they are expanded or retracted.

As will be noted above, in the depicted embodiment, the bore defined in the housing means includes a loading section whose internal diameter is substantially matched to the internal diameter of the chuck means at its receiving end. The internal diameter of the loading section 27 of the bore 15 and the chuck bore 37 (at its receiving end) is equal to or slightly larger than the diameter of the head 59 of the rivet to be received therein so that the enlarged rivet head 59 is slidably received within either the bore or within the chuck.

In use, a rivet-nail assembly is dropped into the receiving end 25 of the housing means 13 (after withdrawal of the driver means) and slides through the loading bore section 27 and into the chuck means 17 where the pointed end 45 of the anvil nail 26 engages the inwardly curved portion of the chuck bore and is thereby guided to a position centrally of the chuck bore where it becomes lodged in a position coaxial with the chuck bore.

To drive the fastening device into the workpiece, there is provided a cylindrical driver punch 19 having a shaft 61 that is slidably received within the housing bore loading section 27 and within the receiving end of the chuck bore. Preferably, the fit of the driver within the chuck bore 37 is sufficiently snug as prevents the driver punch from being withdrawn inadvertently, such as when the tool is upsidedown, but rather a positive force must be applied to withdraw the driver. The leading end of the punch shaft preferably is substantially flat to engage the surface on the head 59 of the rivet and to impart blows to the rivet without scoring rivet head. Scores on the rivet head will weaken the rivet and may cause the rivet to fail. The punch is further provided with an elongated head 63 adapted to be struck, such as by a hammer blow, to force the punch shaft 61 against the rivet to urge the chuck jaws 33 and 35 to open and move the rivet out of the chuck into the workpiece.

To maintain the jaws 33 and 35 of the chuck in their retracted or closed position (see FIG. 4), in the preferred embodiment, the jaws, in their mated position, are received within the discharging section 39 of the housing bore 15 with a substantial portion of the length of the jaws projecting outwardly from the housing. As noted above, the housing 13, preferably is of a resilient material that permits at least limited expansion of the jaws at their discharging ends, sufficient to permit the passage between the expanded jaws of the head 59 of the fastening device. After the rivet has been driven into the workpiece and the driver 19 retracted, the housing contracts to urge the jaws to their closed position for receiving a further fastening device. It is noted that only the discharging ends 41 of the jaws need expand so that the angular motion of the receiving ends 39 of the jaws move relatively little. Such movement is accommodated by the geometry of the lugs 55 and cavities 57 while preventing longitudinal shifting of the jaws relative to one another.

In an alternative embodiment as shown in FIG. 6, there is provided a resilient sleeve 65, e.g., rubber tubing, between the outer circumference of the chuck 19 and the internal circumference of the bore 15. Such sleeve 65 functions to accommodate lateral expansion of the jaws 33 and 35 within the housing bore and to urge the jaws to their closed positions. These functions of the sleeve are enhanced by extending the sleeve to encompass a major portion of that portion of the chuck which projects from the housing 13.

A further alternative embodiment is shown in FIG. 10, and reference characters with a suffix "A" are used to designate elements previously described. In this tool 11A, the metal sleeve bushing 31 shown in the embodiment of FIG. 1 has been eliminated and the housing means 13A of high impact plastic material is extended downwardly to abut the top ends of the circumferential flange 47A of the rigid jaws 33A and 35A. These jaws may be similar to the jaws hereunder described in connection with FIG. 1. The lower portion of the elongated bore 15A is provided with an enlarged diameter lower portion terminating at a shoulder 60, as best seen in FIG. 10, which abuts the upper end of the jaws. The upper smaller diameter portion of the bore 15A is sized to the internal diameter of the bore defined by the jaws. Preferably, the cylindrical drive punch 19A has its lower end 68A chamferred. The chamfer facilitates the insertion of the punch shaft 61A into the bore defined by the jaws without catching on the upper ends of the jaws. Also, the chamfer reduces the tendency of the leading end of the shaft to snag or otherwise score the high impact plastic material encircling and defining the upper end of the bore 15A. This latter embodiment shown in FIG. 10 contains less parts and should be less expensive than the other embodiments.

While each of the illustrated embodiments discloses an orienting means in the form of a frusto-conical surface 49 or 49A for insertion into a complementary shaped cavity 24A of a belt fastener, it is to be appreciated that the frusto-conical surface may be eliminated when the hand-rivet tool is used in other applications where there is no such cavity. For instance, if the driver tool is used with a concrete nail, the bottom portion of the jaws may be flat and wide for resting on a 2-by-4 or the concrete directly. One particular form of concrete nail is provided with a guiding and encircling flat washer attached to its lower end to assist in holding the longitudinal axis of the nail in a position substantial coaxial with the bore of the applying tool. With the pivoted jaws of the present tool, the concrete nail could be aligned without the use of the washer. Also, various rivets along, i.e., without a nail, could be driven with the tool of this invention. Also, other kinds of rivet-nail combinations could be driven by the tool and the invention is not to be construed as being limited to rivet-nail combinations illustrated herein.

The described tool is safe for the operator and insures that the force applied to an elongated fastener is along its longitudinal axis which is coaxial with an axis through the tool. Also, the operator may position the tool properly on a workpiece with a single hand while holding a hammer in the other hand. The stabilizing means aids the operator in positioning the tool for proper angular insertion of the elongated rivet-nail assembly, particularly where the angle of insertion is critical.

While a preferred embodiment has been shown and described, it will be understood that there is no intent to limit the invention by such disclosure, but rather, it is intended to cover all modifications and alternate constructions falling within the spirit and scope of the invention as defined in the appended claims.

What is claimed is:

1. In a tool for use in positioning and inserting elongated fastening devices in a workpiece, the improvement comprising expandable housing means defining an elongated bore having a longitudinal axis and extending through said housing means, said bore having a receiving end and a discharging end, elongated laterally expandable chuck means disposed at least partly within said bore in axial alignment with said bore, said chuck means receiving said fastening device, said chuck comprising at least two elongated jaws cooperatively defining an axial bore having a receiving end and a discharging end, the inner diameter of which tapers radially inwardly from a point within said bore toward said discharging end, an orienting means integral with said jaw means for orienting the longitudinal axis of said housing means including a means defining a truncated conical outline at the discharging end of said jaws and a radially outwardly extending shoulder means located above said truncated conical outline, and driver means including a force-receiving end and a driving end slidably received within said chuck means.

2. A tool as described in claim 1 wherein said housing means comprises a nonrigid tube, including a receiving end and a discharging end, and an integrally attached flange extending radially outward at the receiving end of said tube, whereby said housing means may be grasped by a hand to dispose said flange between said grasping hand and said receiving end of said driving means.

3. In a tool for use in positioning and inserting elongated fastening devices in a workpiece, the improvement comprising expandable housing means defining an elongated bore having a longitudinal axis and extending through said housing means, said bore having a receiving end and a discharging end, elongated laterally expandable chuck means disposed at least partly within said bore in axial alignment with said bore, said chuck means receiving said fastening device, said chuck comprising at least two elongated jaws cooperatively defining an axial bore having a receiving end and a discharging end, the inner diameter of which tapers radially inwardly from a point within said bore toward said discharging end, driver means including a force-receiving end and a driving end slidably received within said chuck means, lug means extending circumferentially from one of said jaws, and cavity means within another of said jaws, whereby said lug is matingly received in said cavity and said jaws are longitudinally fixed with respect to each other.

4. A tool as described in claim 3 wherein said housing means includes an elastic rubber sleeve lining the surface of at least the discharging end of said bore, said rubber sleeve extending beyond said discharging end of said bore and radially, substantially encompassing said chuck means.

5. In a tool for use in positioning and driving elongated rivet-nail assemblies through a belt and into belt fasteners, the improvement comprising expandable housing means defining an elongated bore with a longitudinal axis extending through said housing means, said bore including a receiving end and a discharging end, elongated barrel means including a receiving end and an inboard end, disposed within said bore in axial alignment therewith, said discharging end of said barrel being disposed within said bore, elongated laterally expandable chuck means disposed at least partly within and extending beyond said discharging end of said bore in axial alignment with said bore and said barrel means and having an inboard end in juxtaposition to said inboard end of said barrel means, said chuck means and said barrel means slidably receiving a rivet-nail assembly, driver means including a force-receiving end and a driving end slidably received within said barrel means and said chuck means, cone-shaped end on said chuck means for insertion into a cavity in a belt fastener, and a shoulder wall on said chuck means to abut the belt fastener and orient said longitudinal axis perpendicular to the belt fastener.

6. A driver tool for a rivet-nail assembly comprising an expandable bulbous housing defining a central longitudinal cylindrical bore therethrough, said bore having a receiving section and a discharging section, rigid tubular sleeve means disposed within said receiving section of said housing bore, laterally expandable chuck means disposed within said discharging section of said housing bore, said chuck means comprising at least two jaws matingly disposed relative to one another to define a central elongated bore that is substantially coaxially aligned with said housing bore and which possesses an internal diameter that is substantially equal to the internal diameter of said housing bore receiving section, a portion of said jaws projecting from the discharging end of said housing bore, radially extending flange means defined by said mating jaws and circumscribing said jaws adjacent the outboard ends thereof, means defining a truncated conical outline at the distal ends of said jaws suitable for being received snugly within a rivet head receiving cavity in a belt fastener plate with said flange resting on the exposed surface of said belt fastener plate adjacent said cavity, said bore defined by said jaws tapering radially inwardly from a location adjacent the outboard ends of said bore to essentially the distal end thereof to define a central exit opening therefrom whereby said pointed end of said guide means is lodged in said exit opening centrally of said chuck bore and in axial alignment therewith, and driver means slidably receivable within said housing bore and said chuck bore for driving said rivet-nail assembly through said chuck means.

* * * * *